(No Model.) 2 Sheets—Sheet 1.
M. MORSE.
FERTILIZER DISTRIBUTER.
No. 557,010. Patented Mar. 24, 1896.
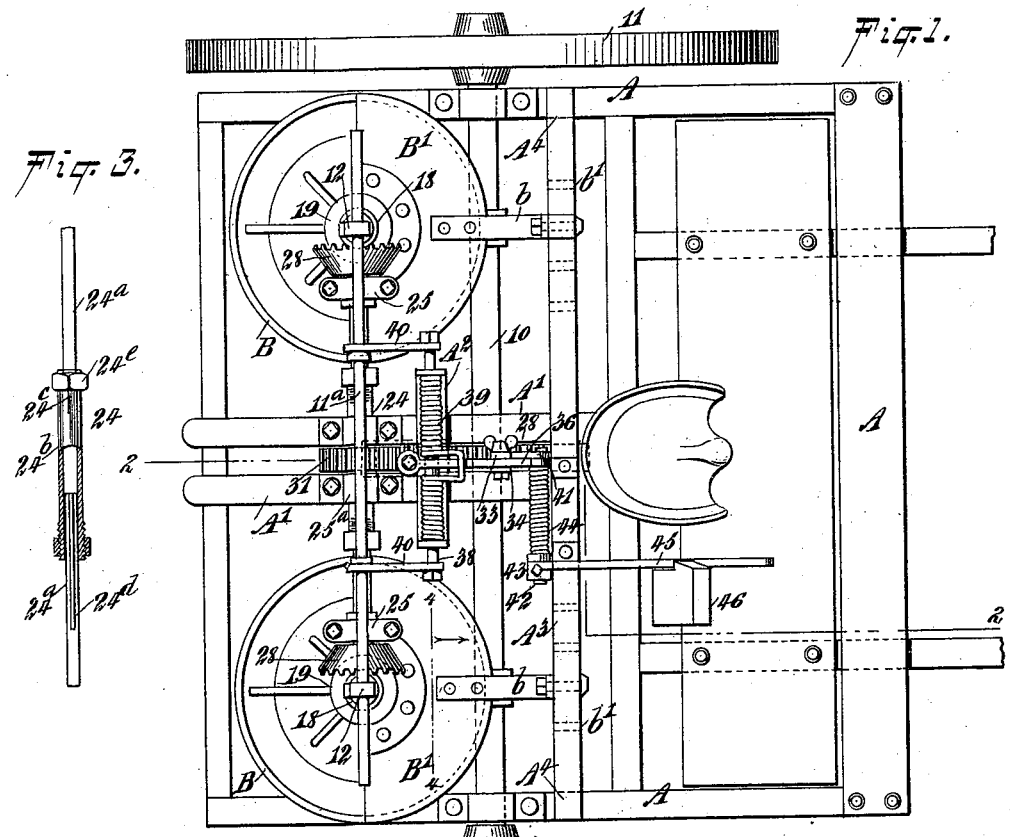
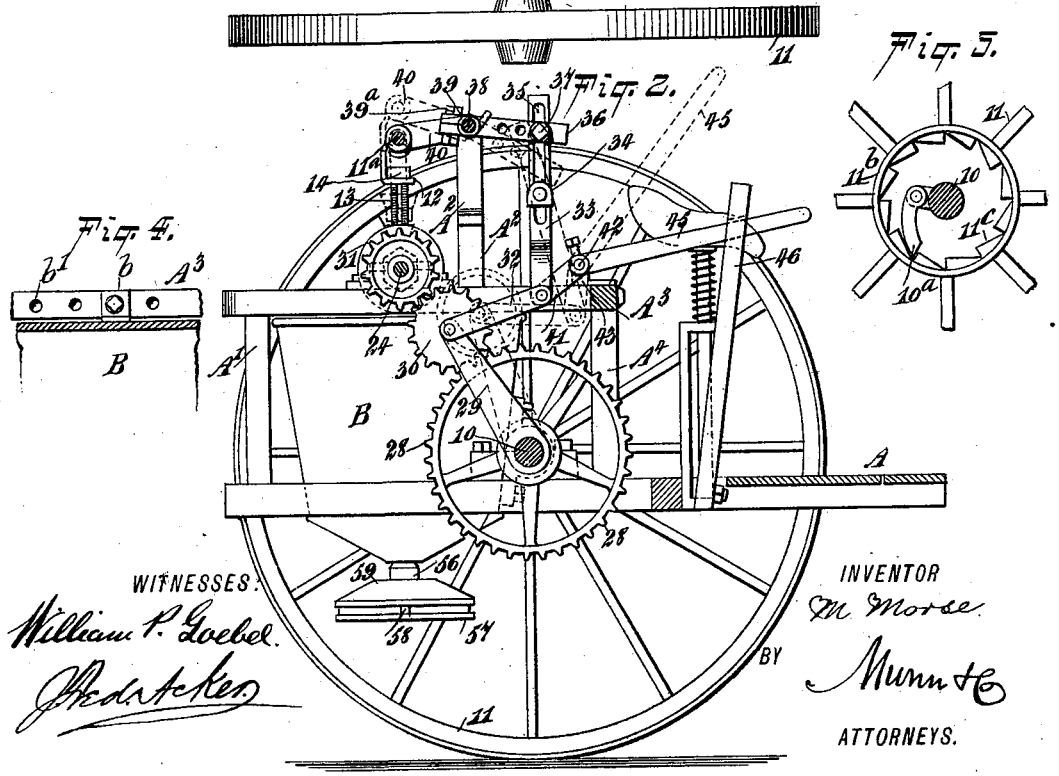
WITNESSES:
William P. Goebel
Fred Acker
INVENTOR
M. Morse
BY
Munn & Co
ATTORNEYS.

(No Model.) 2 Sheets—Sheet 2.

M. MORSE.
FERTILIZER DISTRIBUTER.

No. 557,010. Patented Mar. 24, 1896.

WITNESSES:
William P. Goebel
Fred Acker

INVENTOR
M. Morse
BY
Munn & Co
ATTORNEYS.

UNITED STATES PATENT OFFICE.

MONROE MORSE, OF MEDWAY, MASSACHUSETTS.

FERTILIZER-DISTRIBUTER.

SPECIFICATION forming part of Letters Patent No. 557,010, dated March 24, 1896.

Application filed October 29, 1895. Serial No. 567,267. (No model.)

*To all whom it may concern:*

Be it known that I, MONROE MORSE, of Medway, in the county of Norfolk and State of Massachusetts, have invented a new and useful Improvement in Fertilizer-Distributers, of which the following is a full, clear, and exact description.

My invention relates to a machine for distributing fertilizing or comminuted material, and it has for its object to construct a machine simply, durably, and economically, and to provide a machine which will distribute fertilizing material in drills as readily and accurately as broadcast, and whereby also the extent to which the material is to be scattered can be conveniently and expeditiously regulated.

Another object of this invention is to construct the machine in such manner that it will not be liable to clog, and will have a maximum capacity for varying the amount of material to be delivered per acre.

The invention consists in the novel construction and combination of the several parts, as will be hereinafter fully set forth and pointed out in the claims.

Reference is to be had to the accompanying drawings, forming a part of this specification, in which similar characters of reference indicate corresponding parts in all the figures.

Figure 6:
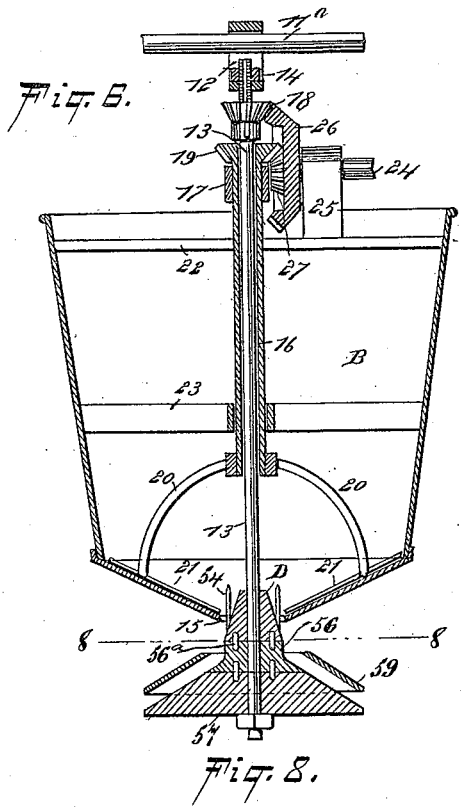
Figure 7:
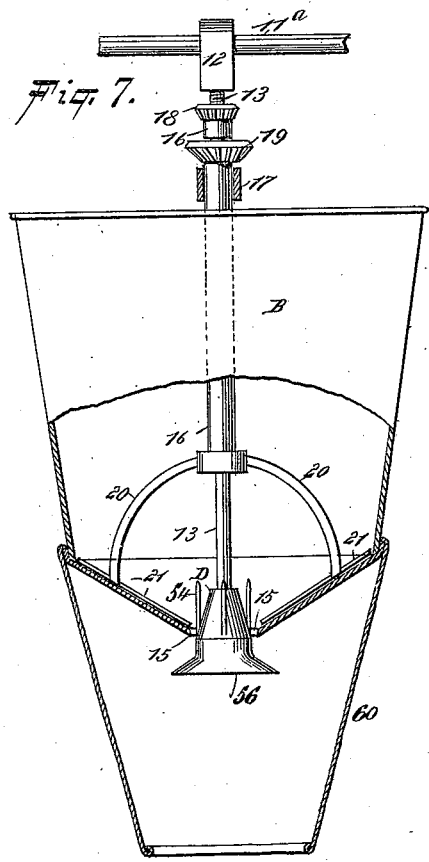
Figure 8:
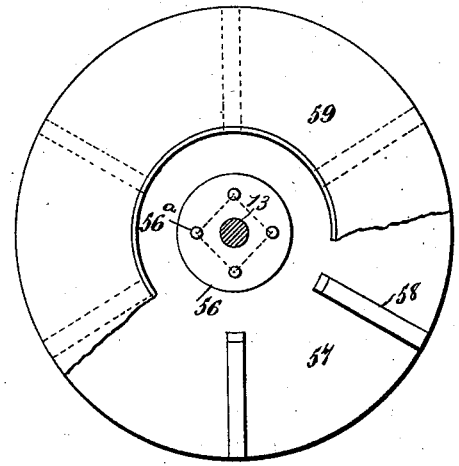
Figure 9:
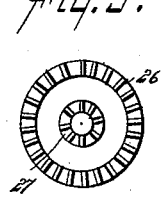

Figure 1 is a plan view of the improved fertilizer-distributer. Fig. 2 is a longitudinal vertical section, taken substantially on the line 2 2 of Fig. 1. Fig 3 is a detail view of a driven shaft of the fertilizer-distributer illustrating the manner in which the shaft is divided in sections and the adjustability of the said sections. Fig. 4 is a detail view illustrating the manner in which the receptacles for the fertilizer may be adjusted to and from each other. Fig. 5 is a section through the axle, illustrating the ratchet-and-pawl mechanism between the driving-wheels and the said axle. Fig. 6 is a vertical section taken through one of the hoppers, the valve and spreading disk thereof, also showing the driving mechanism, disks and valves in section, the disks being arranged for broadcast work. Fig. 7 is a partial side elevation and partial vertical sectional view of a hopper and the attachment thereto adapted for delivering the fertilizing material in drills. Fig. 8 is a horizontal section taken substantially on line 8 8 of Fig. 6, and Fig. 9 is a face view of the double gear employed in the driving mechanism for the spreading disks and agitator.

In carrying out the invention the frame A is of skeleton construction and preferably of somewhat rectangular shape, and upon the central portions of the frame transverse railings A' or their equivalents are constructed, and the said railings support a framework $A^2$, usually of somewhat U shape, the framework $A^2$ being made to face the front and rear of the central portion of the machine, the length of the framework being in direction of the sides of the frame proper.

The axle 10 is journaled in the body portion of the frame and is provided at its ends with ground-wheels 11 secured thereto, and one or more hoppers B are supported vertically in the main frame A, and when two hoppers are used they are adjustably secured to the said frame, their adjustment being to and from one another, so as to admit of the fertilizer being delivered in drills at different distances apart; and preferably this adjustment is accomplished by extending a cross-bar $A^3$ from side to side of the frame at the side of the axle, supported on uprights $A^4$, the said cross-bar being provided with a number of apertures $b'$ longitudinally arranged therein, and brackets $b$ are attached to the upper portions of the hoppers B, and bolts or their equivalents are passed through the said brackets, each bolt having engagement in one of the apertures $b'$ in the aforesaid cross-bar $A^3$, as is illustrated in Figs. 1 and 4. These hoppers are provided with substantially conical bottoms, and over the hoppers a lifting-bar $11^a$ is supported in a manner to be hereinafter set forth, and the said bar immediately over each hopper is made to carry a stirrup 12. Each stirrup is adapted for the vertical adjustment of an upright shaft 13, and such a shaft is provided for each hopper. These shafts are loosely entered into the stirrups and are provided with caps or collars 14 at their upper ends, which have bearings upon the base portions of the stirrups. The shafts 13 extend vertically downward from the central portion of the hoppers and out through openings 15 in the bottoms of the same, the openings being at the central portion of the said bottoms, as illustrated in Figs. 6 and 7.

A tubular shaft 16 is held to revolve around each of the vertical shafts 13, being supported in suitable brackets 17, and the upper end of each shaft 13 or that portion extending above the tubular shaft 16 is threaded, and the threaded portion is made to receive a beveled gear 18 secured thereon to stand in a direction the reverse of that in which the shaft will revolve, and a beveled gear 19 is attached to the upper portion of the tubular shaft 16 surrounding the shaft 13, and the gear 19 is preferably made to rest upon the bracket 17 supporting the shaft, the said bracket serving as a collar.

Arms 20 are projected downward from the lower end of each tubular shaft 16, each arm being made to carry an agitating-bar 21, and when the said shaft is revolved these bars will be carried over the conical bottom of the hopper in which they are located, extending from the opening 15 in the bottom to the sides thereof, as shown in Figs. 6 and 7. Cross-bars 22 and 23 are located in each hopper, serving as supports for the shafts 13 and 16.

A shaft 24 is journaled in end bearings 25 located upon the covers B of the hoppers, as are likewise the brackets 17, and a central bearing 25$^a$ supports the central portion of the shaft 24, being secured upon the railings A'. The covers B' of the hoppers are preferably made to extend over but one-half of the same, as shown in Fig. 1. The shaft 24 is made telescopic to admit of the adjustment of the hoppers to and from one another, and is provided at or near each outer end with what may be termed a "double" or "compound" gear, each compound gear consisting of a large beveled gear 26 meshing with the pinion 18 on one of the shafts 13 and an inner pinion 27 of the same character, which meshes with the gear 19 on the tubular shaft 16 of one of the hoppers, as shown in Figs. 6 and 7.

The shaft 24 is shown in Fig. 3 and preferably comprises a central tubular section 24$^b$ and solid end sections 24$^a$, the tubular section 24$^b$ being provided with slots 24$^c$ at its ends, and the slotted portions of the tubular section are clamped securely to the inner ends of the solid sections of the shaft by locknuts 24$^e$, while the solid sections are provided with feathers 24$^d$ to insure all of the sections of the shaft turning together.

The shaft 24 is driven from the axle 10 of the machine, and this is accomplished by securing a large gear 28 upon preferably the central portion of the axle and locating at each side of the said gear an arm 29 loosely mounted on the axle, and these arms carry at their upper ends a pinion 30 adapted to mesh with the teeth of the large gear 28, and likewise mesh with the teeth of a pinion 31 secured upon the central portion of the line-shaft 24.

Links 32 are pivoted on the trunnions of the shifting-pinion 30, and these links are pivotally connected with an upright 33, which is provided with an adjustable stop 34 capable of being slid longitudinally of the upright in a slot 35 made in the latter. An arm 36 is pivotally and adjustably connected by a bolt 37 with the upright 33 above the stop, the bolt passing through the slot 35 in the said upright, and the said arm 36 is adjustably connected with a spindle 38, the said spindle being journaled in the U frame A$^2$ attached to the main frame, and this spindle is surrounded by a tension-spring 39, preferably bowed at its center, being secured at one end to the spindle and at the opposite end to the frame.

The spindle extends beyond the ends of the frame A$^2$ in which it is journaled, and is provided at each extremity with a link 40, and these links are connected with the lifting-rod 11$^a$ carrying the stirrups connected with the hopper-shafts 13 and serve to support the said rod. At the bottom of the upright 33 a short link 41 is pivoted, and this link is carried in a forwardly direction to a connection with a short shaft 42 journaled in suitable bearings 43 secured to the main frame, as shown in Figs. 1 and 2, and this shaft is surrounded by a spring 44 attached to it and to one of its bearings, and the shaft is also provided with an attached lever 45 adapted for engagement with a keeper 46 located adjacent to the driver's seat. When the lever 45 is disengaged from its keeper 46 the spring 44 on the shaft 42 will act to throw the lever to the upper position (shown in dotted lines in Fig. 2) and give the upright 33 the rearwardly-inclined position, (also shown in dotted lines in Fig. 2,) and the spring 39 on the spindle 38, the bow portion of which passes over the arm 36 connected with the upright, will at the same time tend to revolve the spindle in a forwardly direction and thereby carry the arms 40 upward, as shown in dotted lines in Fig. 2, and raise the lifting-rod 11$^a$, thereby carrying the shafts 13 of the hoppers out of driving engagement with the compound gears on the line-shaft 24; but when the lever 45 is in engagement with the keeper the several parts above described will be in such position that the said shafts 13 will be driven.

The arm 36 of the shifting mechanism just described is split where it is connected with the spindle, and the split portion is held together by a bolt 39$^a$, in order that the arm may be readily removed when desired.

The traction-wheels 11 operate the axle through the medium of a pawl-and-ratchet mechanism, which consists in hollowing the inner faces of the hubs 11$^b$ of these traction-wheels and providing the said inner faces with teeth 11$^c$, as shown in Fig. 5, to be engaged by dogs 10$^a$ connected with the axle 10, and the connection between the dogs and the ratchet-teeth 11ᶜ is such that the axle will be turned only while the machine is being drawn in a forwardly direction.

A valve D is secured upon the lower end of each vertical shaft 13, being of substantially conical shape, and the valves enter the openings 15 in the hoppers B. The said valves D are provided with pins or fingers 54 attached to their sides and likewise extending upward in the openings 15 in the hoppers, in order to pulverize the fertilizing material in the event of its escape through the aforesaid opening. The valve is provided with a spreading head 56, secured thereto preferably by means of dowels 56ᵃ, as shown in Figs. 6 and 8, and the said spreading head is made somewhat flaring or conical at its lower end and is attached to a spreading disk 57 also through the medium of dowels or their equivalents, so that the spreading disk may be removed from the spreading head. The spreading disk is shaped substantially as the frustum of a cone, and its upper reduced end fits neatly to the flaring lower end of the spreading head, the spreading disk being of any predetermined diameter at its base, and these several parts—namely, the valves, spreading head, and spreading disk—are held on the shaft 13, to which they are to be attached by means of a nut or the equivalent of the same. The spreading disk is provided upon its upper inclined face with any desired number of diametrical ribs 58, and the said ribs are adapted to space the spreading disk and the flaring portion of the spreading head from a conical fender 59, having an opening at its top of much greater diameter than the diameter of the spreading head above its flaring surface, since when the fender is supported on the spreading disk it will at its upper end surround the upper portion of the spreading head, as is particularly shown in Fig. 6.

In operation the fertilizing material will fall in greater or less quantities, according to the vertical adjustment of the shafts 13, through the openings 15 in the hoppers and upon the tapering surface of the spreading heads, sliding down the tapering surface of the spreading disk, where, through centrifugal action, the material will be thrown off broadcast over a predetermined area of ground, fertilizing the same, the fender preventing the fertilizing material from being affected by strong breezes or leaving the spreading disk at any other point than at its base, since the fender does not extend down to the said base. When, however, the machine is to be used for depositing the fertilizing material in drills, the spreading disk 57 is removed, as shown in Fig. 7, and the material will then fall on the flaring surface of the spreading head and will not be so widely scattered, and the material is confined and directed to a certain area of ground by placing a casing 60, open at its bottom, upon the bottom of the hoppers, the casing being made tapering or smallest at its lower end. This casing may be made of canvas or a like material, and effectually prevents the wind from interfering with the proper deposit of the aforesaid fertilizing material.

Having thus described my invention, I claim as new and desire to secure by Letters Patent—

1. In a fertilizer-distributer, a hopper having a valve-controlled opening, the said valve being capable of a rotary movement within said opening and of a vertical movement to close or to control the exit area of the opening, as and for the purpose set forth.

2. In a fertilizer-distributer, or the like, the combination of a frame, distributing-hoppers carried thereby and adjustable toward and from each other, valves for the hoppers arranged to control the discharge of material therefrom, a shaft having driving mechanism and gearing between said shaft and the valves of said hoppers, said shaft comprising a central tubular section connected with the driving mechanism, end sections arranged to slide in the tubular section and carrying-gears whereby the valves in the hoppers are driven, and means for securing the end sections to the tubular end sections, substantially as set forth.

3. In fertilizer-distributers or like machines, distributing-hoppers adjustable to and from each other, each hopper having a valve-controlled opening, the valves being capable of rotary movement within the said opening and of vertical movement to close or to control the exit area of the opening, and a driving-shaft constructed in telescopic sections, whereby the said shaft may be lengthened or shortened according to the spacing of the aforesaid hoppers, as and for the purpose set forth.

4. In a fertilizer-distributer or like machine, a hopper provided with an outlet, a shaft extending through the said outlet and capable of a rotary and of a vertical movement, a valve capable of closing or of partially closing the said outlet in the hopper, and provided with agitating pins or fingers extending within the hopper, and a distributing-head attached to the said valve below the hopper, receiving upon it the material dispensed by the hopper, as and for the purpose specified.

5. In a fertilizer-distributer or like machine, the combination, with a hopper provided with a delivery-opening, of a valve regulating the delivery from said opening, the said valve being provided with agitating projections extending upward within the hopper, as and for the purpose set forth.

6. In a fertilizer-distributer, the combination, with a hopper provided with a delivery-opening, of a valve regulating the delivery from the said opening, said valve being provided with a conical base or lower section below the hopper, as and for the purpose specified.

7. In a fertilizer-distributer, the combination, with a hopper provided with a delivery-opening, of a valve regulating the delivery from said opening, said valve being provided with a conical base or lower section below the hopper, and the said tapering base being made in detachable sections, whereby the area of the base may be changed and the area of distribution of the fertilizing material increased or decreased as desired, as and for the purpose set forth.

8. In a machine for distributing fertilizer, a hopper provided with an outlet-opening, a shaft extending through the outlet-opening, capable of a rotary and a vertical movement, a second shaft held to revolve around the vertically-adjustable shaft and provided with agitating-arms located within the hopper, a valve capable of partially or entirely closing the outlet of the hopper by the vertical adjustment of the said vertically-adjustable shaft to which said valve is secured, and a spreading head secured to the said valve at its lower end, as and for the purpose specified.

9. In a fertilizer-distributer, a hopper having an outlet therein, a shaft extending through the said hopper, a valve carried by the said shaft, capable of closing or of partially closing the outlet of the hopper and provided with a flaring lower end, a spreading disk of substantially conical shape, removably attached to the spreading portion of the valve, and a fender surrounding the spreading portion of the said valve, as and for the purpose set forth.

10. In a fertilizer-distributer, the combination, with a hopper provided with an outlet-opening, of a valve controlling the exit of material from the said opening, the said valve being provided with a spreading head located below the hopper, and a fender surrounding the said spreading head, and spaced therefrom, as and for the purpose set forth.

11. In a fertilizer-distributer, a hopper having an outlet therein, a shaft extending through the said hopper, a valve carried by the said shaft, capable of closing or of partially closing the outlet of the hopper and provided with a flaring lower end, a spreading disk of substantially conical shape, removably attached to the spreading portion of the valve, a fender surrounding the spreading portion of the valve and a portion of the spreading disk, being separable from both, and a hollow shaft held to revolve around the valve-carrying shaft and provided with agitating-arms fixed to revolve over the bottom of the hopper, and agitating-fingers extending from the valve upward within the outlet of the hopper, as and for the purpose set forth.

12. In a fertilizer-distributing or similar machine, a hopper having an outlet in its bottom, agitators held to revolve within the hopper over its bottom portion, a valve located within the outlet-opening, the said valve being capable of a vertical and of a rotary movement, having a flaring base below the bottom of the hopper, and a shield surrounding the outer portion of the said valve and connected with the bottom of the said hopper, whereby the material distributed from the valve will be confined to a predetermined area of ground, as and for the purpose set forth.

MONROE MORSE.

Witnesses:
CHARLES F. NYE,
ORISTES T. DOE.